Nov. 30, 1965  L. P. GARVEY ET AL  3,220,762
EASY ENTRANCE SEAT
Filed Jan. 5, 1956  3 Sheets-Sheet 1

INVENTORS
Louis P. Garvey &
Clyde N. Schomer
BY Paul Fitzpatrick
ATTORNEY

Nov. 30, 1965     L. P. GARVEY ET AL     3,220,762
EASY ENTRANCE SEAT
Filed Jan. 5, 1956     3 Sheets-Sheet 2
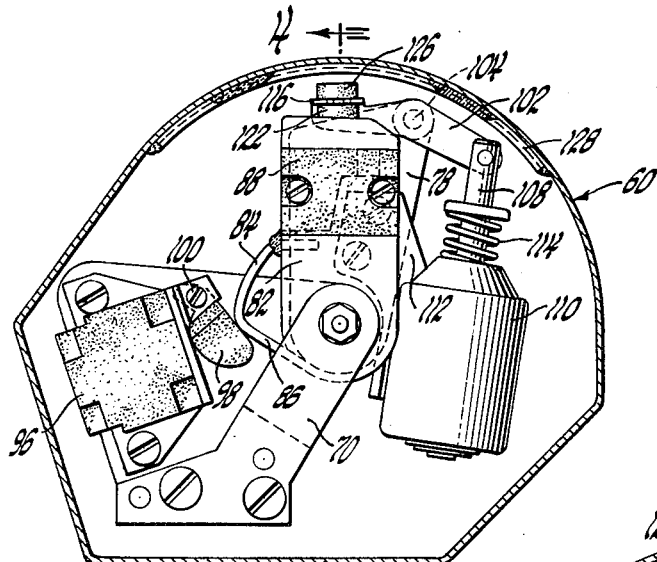
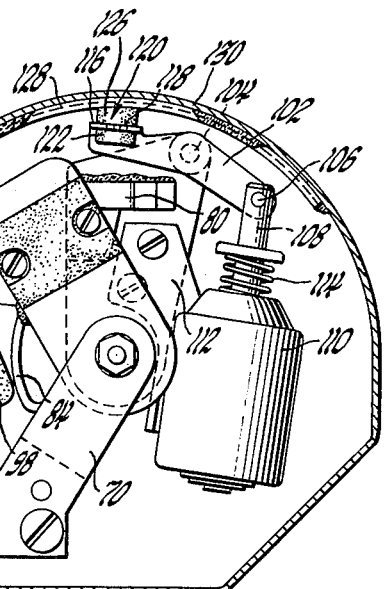
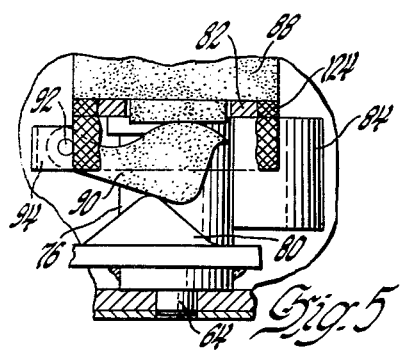
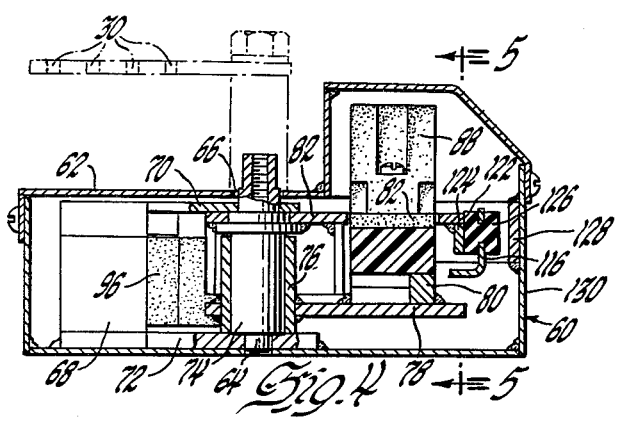
INVENTORS
Louis P. Garvey &
Clyde K. Schamel
BY
Paul Fitzpatrick
ATTORNEY

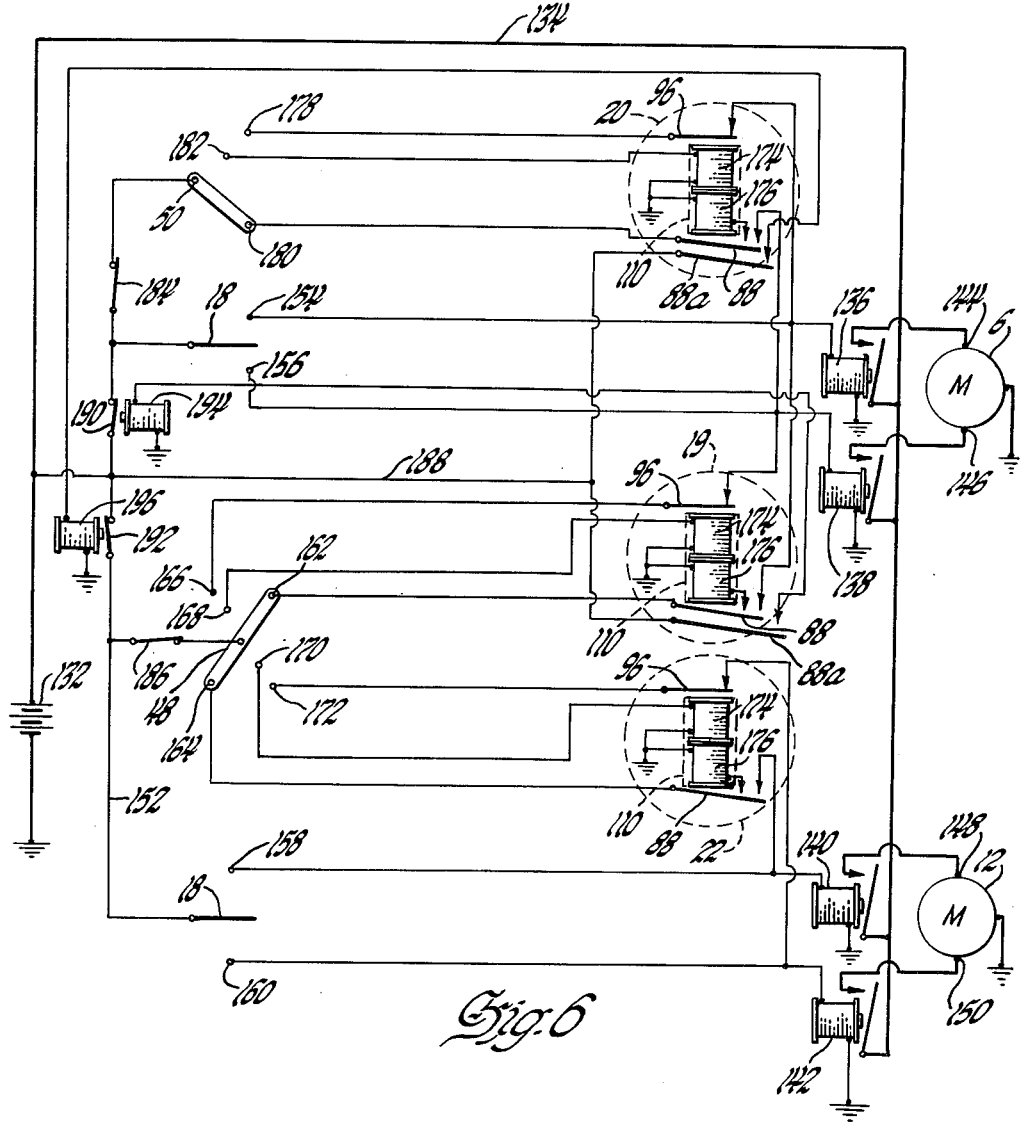

United States Patent Office 3,220,762
Patented Nov. 30, 1965

1

3,220,762
EASY ENTRANCE SEAT
Louis P. Garvey, Detroit, and Clyde H. Schamel, Royal Oak, Mich., assignors to General Motors Corporation, Detroit, Mich., a corporation of Delaware
Filed Jan. 5, 1956, Ser. No. 557,478
22 Claims. (Cl. 296—68)

This invention relates to vehicle seats and more particularly to automatically operable seat actuating mechanisms for temporarily displacing the seat from a predetermined position to provide maximum passenger clearance and subsequently returning the seat to the predetermined position of adjustment.

An object of the invention is to provide an improved seat adjuster mechanism and automatic control therefor.

Another object is to provide a power operated seat which is manually adjustable to any desired position and automatically displaced from and returned to said position responsive to opening and closing, respectively, of a vehicle door.

A further object is to provide a four-way seat adjuster having an automatic control mechanism associated therewith effective to displace the seat from a preselected adjusted position anywhere within the range of movement of the seat and to subsequently return the seat to the preselected adjusted position.

Still another object is to provide an automatic control mechanism for a four-way adjustable vehicle seat whereby said seat may be automatically displaced in two planes simultaneously from a given position and subsequently returned to the predetermined position with reference to both planes.

A still further object is to provide, in a vehicle seat adapted for power operated horizontal and vertical adjustment, a manual control for selectively imparting movement to the seat to a desired vertical and horizontal position, and a vehicle door responsive automatic control effective in one door position to temporarily displace the seat from the desired position to its maximum limit of movement in both planes, the control being effective in another door position to return the seat to the originally selected desired position.

Yet a further object is to provide a device of the stated character including additional automatic control mechanism arranged to respond to a second vehicle door, and effective in one door position to displace the seat to its maximum horizontal limit of movement in a direction opposite that caused by the first control, the other door position being effective to return said seat rearwardly to the preselected position.

Still a further object is to provide an automatic control mechanism for a movable structure capable of defining a fixed limit of movement in one direction and an adjustable limit of movement in the opposite direction.

Yet another object is to provide a control assembly of the stated character which is entirely self-contained so as to permit mounting thereof in any desired position relative to the movable structure to be controlled.

Yet a further object is to provide an automatic control mechanism of the stated character incorporating variable ratio controlling linkage permitting the range of movement of the control mechanism to be synchronized readily with the range of movement of the structure controlled thereby.

A still further object is to provide a structure of the stated character wherein the door responsive automatic control mechanisms are arranged for actuation respectively by the front and rear doors of a four door vehicle, whereby opening movement of the front door causes the vehicle seat to move downwardly and rearwardly to its

2 maximum limit and closing of the door causes return of the seat both forwardly and upwardly to its original preselected position, while opening movement of the rear door causes forward displacement of the seat to its maximum limit, and closing movement thereof causes the rearward displacement of the seat to the same preselected position.

These and other objects and advantages of the invention will become more fully apparent as reference is had to the accompanying specification and drawings wherein:

FIG. 2 is a top plan view, partly in section, showing the details of construction of the automatic control mechanism in one position of adjustment.

FIG. 3 is a top plan view, partly in section, similar to FIG. 2, showing the arrangement of parts in another position of adjustment.

FIG. 4 is a sectional elevational view, partly in section, looking in the direction of arrows 4—4 of FIG. 2.

FIG. 5 is an enlarged fragmentary view, partly in section, looking in the direction of arrows 5—5 of FIG. 4; and FIG. 6 is a schematic diagram showing an electrical circuit for energizing the mechanism.

Figure 1:
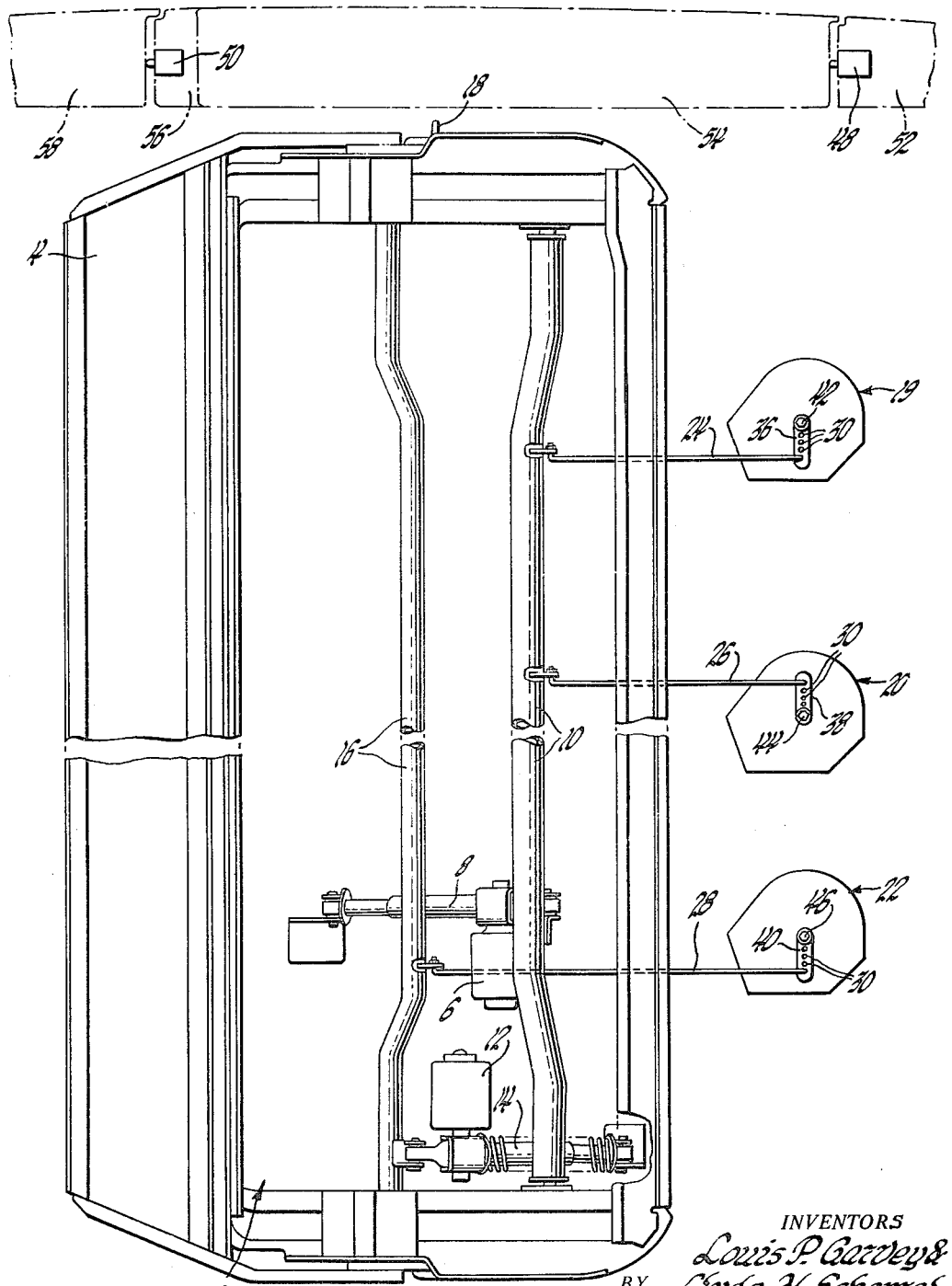
FIG. 1 is a skeletonized top plan view of a vehicle seat illustrating the general arrangement of a power operated seat adjuster and the automatic control mechanism associated therewith.

Referring now to the drawings and particularly FIG. 1, there is illustrated a four-way adjustable seat 2. The term four-way adjustable as used herein refers to a seat which is capable of horizontal fore and aft adjustment as well as substantially parallel up and down movement relative to the supporting surface or vehicle floor 4. Since the invention is not limited to any particular form of four-way seat, it will be understood that the seat illustrated herein is for illustrative purposes only. Accordingly, a detailed description thereof will be omitted. For a complete and detailed description of a seat of the type illustrated, reference may be had to the copending application of Louis P. Garvey et al., Serial No. 395,822, filed December 2, 1953, entitled Seat Adjuster, assigned to General Motors Corporation, now Patent No. 2,809,689, granted October 15, 1957. For the purposes of the present invention, it will be understood that horizontal fore and aft movement of the entire seat 2 is accomplished by energizing a reversible electric motor 6 which, in turn, imparts rotation to a telescoping screw jack 8. Jack 8, in turn, causes rotation of a transversely extending torque rod 10 either clockwise or counterclockwise as the case may be. Thus, for example, clockwise rotation of rod 10 causes forward movement of the seat, while counterclockwise rotation of rod 10 causes rearward movement of the seat. Elevational adjustment of seat 2 is accomplished by energizing a reversible electric motor 12 which, in turn, imparts rotation to a screw jack assembly 14. Screw jack 14, in turn, causes either clockwise or counterclockwise rotation of a second transversely extending torque rod 16, causing either upward or downward movement of the seat, as the case may be. Thus, for example, clockwise rotation of rod 16 imparts upward movement to seat 2 while counterclockwise rotation of rod 16 causes downward movement of seat 2. Energization of motors 6 and 12 is manually controlled by a switch indicated generally at 18. Switch 18, preferably a four position switch assembly, is effective to energize motor 6 by swinging movement fore and aft from a centered position, and to energize motor 12 by swinging movement up and down from the centered position. It will be understood, however, that switch 18 is not necessarily limited to the form described, but may be any suitable type.

In accordance with the general features of the invention, there are provided a plurality of identical electro-mechanical control assemblies 19, 20 and 22 which are secured to the vehicle floor 4 adjacent the front edge of the vehicle seat 2. It will be understood that the location of assemblies 19, 20 and 22 is in no sense restricted to that shown, but may be located in any convenient position. Each control assembly 19, 20 and 22 includes rotary internal mechanism, shortly to be described, which is mechanically connected to torque rod 10 or 16 by means of links 24, 26 and 28, respectively. In order to synchronize the arcuate range of movement of each internal mechanism with the rotary range of movement of its associated torque rod, the forward end of each link 24, 26 and 28 is selectively disposable in any one of a plurality of apertures 30, formed in radially extending legs 36, 38 and 40, respectively. Legs 36, 38 and 40, in turn, are rigidly connected to vertically directed shafts 42, 44 and 46 which are connected to and define the axis of motion of the internal rotary mechanism of each control assembly 19, 20 and 22, respectively. It will be evident that by placing the forward end of each of the rods 24, 26 and 28 in an appropriate aperture, the arcuate range of movement of the rotary mechanisms of assemblies 19, 20 and 22 may be made to correspond with the rotary range of movement of the associated torque rod 10 or 16, and, therefore, any given angular position of legs 36 and 38 will correspond to a related longitudinal position of seat 2, while a given angular position of leg 40 will correspond to a related vertical position of seat 2.

In accordance with another feature of the invention, each automatic control assembly 19, 20 and 22 has mounted interiorly thereof, a fixed limit switch, shortly to be described, which is effective to define the maximum limit of movement of the seat in one direction, and a movable limit switch which is effective to define the limit of movement of the seat in the opposite direction, when either electric motor 6 or 12 is energized by a switch 48 or 50. Switch 48 is a two position switch which in the illustrated embodiment is located in door sill 52 and is adapted for engagement with the front edge of vehicle front door 54. When the door 54 is open, switch 48 is spring urged to a position causing simultaneous energization of both the vertical and horizontal drive electric motors 6 and 12 to displace the seat downwardly and rearwardly until legs 36 and 40 of automatic control assemblies 19 and 22 are rotated to positions causing the fixed limit switches, previously referred to, to deenergize the circuit. When door 54 is closed, switch 48 is moved to a position simultaneously energizing motors 6 and 12 to cause forward and upward movement of the seat to the position occupied when the cycle began, at which point the movable limit switch deenergizes the circuit established by switch 48. Switch 50, in turn, is a two position switch which is mounted in the rear door sill 56 and is adapted for engagement by the front edge of rear door 58. When door 58 is open, switch 50 moves to a position energizing horizontal drive motor 6 in a direction which actuates seat 2 forwardly until the circuit is broken by the fixed limit switch associated with automatic control 20. When door 58 is closed, switch 50 is moved to a position causing drive motor 6 to be energized in the opposite direction causing return of the seat 2 to the original position at which point the movable limit switch of assembly 20 deenergizes the circuit.

In order to accomplish automatic control of the seat in the manner described, each of the automatic control assemblies 19, 20 and 22 are constructed as illustrated in FIGS. 2, 3, 4 and 5. As seen particularly in FIGS. 2 and 3, each assembly comprises a sheet metal housing 60 having a cover plate 62 secured over the open top side thereof. Centrally disposed in housing 60 is a vertically extending pivot member 64, the upper end of which extends outwardly through an aperture 66 in cover 62 for connection with operating legs 36, 38 or 40, previously mentioned. Pivot member 64 is rotatably supported in housing 60 by a supporting frame 68 having inwardly directed parallel vertically spaced leg portions 70 and 72. Disposed in surrounding relation with the enlarged midportion 74 of pivot 64 is a sleeve structure 76 which has integrally attached thereto a radially extending plate 78. On its upper surface and near its outer end, plate 78 is formed with a wedge-shaped vertically directed cam portion 80, the purpose of which will be described shortly. Spaced vertically from plate 78 in parallel relation therewith is a second plate 82, the inner end of which is secured, as by welding, to pivot 64. Plate 82 includes an arcuate vertical wall portion 84 radially spaced from pivot 64. Wall portion 84 terminates in an abrupt shoulder portion 86, the purpose of which will be described shortly. Near its outer end, plate 82 has secured thereto an electrical switch 88. Switch 88 is operated by a swinging lever 90 which is pivotally connected on a horizontal axis to plate 82 by means of a pivot pin 92 which, in turn, is connected to ears 94 formed integrally at one edge of plate 82. Switch 88 is a normally closed switch which is movable to open position when lever 90 is forced upwardly by engagement with wedge-shaped cam 80, previously mentioned, of plate 78. Thus, switch 88 is closed during arcuate movement of plate 82 in either direction relative to plate 78, deenergization occurring only when plate 82 occupies an arcuate position corresponding to the arcuate position of plate 78. Fixedly mounted at one side of supporting frame 68 is a second electrical switch 96 which is substantially similar to switch 88, but which is mounted so that the operating lever 98 therefor is swingable about a vertical axis defined by pivot pin 100. Switch 96 is a normally closed switch which is deenergized when cam surface 84 on plate 82 engages lever 98. Thus, when plate 82 is moved counterclockwise to the position shown in FIG. 3, lever 98 is caused to swing inwardly and deenergizes the circuit controlled by switch 96. It will thus be seen that clockwise movement of switch 88 to a position engaging wedge cam 80 (FIG. 2) defines the forward limit of movement of the seat when energized by switch 48, while counterclockwise rotation of plate 82 to the position shown in FIG. 3 causes the switch 96 to define the rearward limit of movement of the seat when energized by switch 48.

In order to selectively adjust the angular position at which switch 88 is moved to off position by wedge cam 80 and thus establish any desired forward limit of movement of seat 2 in response to closing of door 54, plate 78 of automatic control assembly 19 is provided with a solenoid operated memory link 102, which is effective to selectively lock plate 78 in fixed angular relation to housing 60 or to lock plate 78 to plate 82 for arcuate movement therewith. Link 102 is pivotally connected at its midportion to the outer end of plate 78 by means of pivot 104. At one end 106, link 102 pivotally engages the actuating stem or plunger 108 of solenoid 110. The body of solenoid 110, in turn, is rigidly secured at one side of plate 78 by means of a bracket 112. Solenoid 110 is provided with two separate coil windings, either of which actuates a stem or plunger 108. Plunger 108 is normally biased axially outwardly by means of a spring 114. When solenoid 110 is energized by either winding, plunger 108 is pulled axially inwardly against the pressure of spring 114. Memory link 102 is, therefore, normally urged in a counterclockwise direction by spring 114 and is temporarily urged in a clockwise direction when solenoid 110 is energized by operation of switch 48. At its free end, memory link 102 is formed with an upturned projection 116 having an aperture 118 formed therein through which extends a rubber foot 120. Foot 120 is provided with an annular reduced portion which occupies aperture 118 and prevents axial displacement of foot 120 relative to finger 116. As seen in FIG. 2, when solenoid 110 is unenergized, the inner end 122 of foot 120 frictionally engages the end wall 124 of plate 82. Consequently, both plates 78 and 82 normally rotate together about their common axis defined by pivot 64. However, when solenoid 110 is energized, memory link 102 is swung in clockwise direction simultaneously relieving the pressure of inner end 122 on wall 124, while effecting frictional engagement between the outer end 126 of foot 120 with the curved serrated wall portion 128 formed on the inner side wall 130 of housing 60. Plate 82 is then free to rotate independently of plate 78, while the latter is retained in a fixed angular position relative to housing 60 by engagement of foot 120 and serrated wall 128. Thus, whenever solenoid 110 is engaged, plate 78 is locked in a position corresponding to the seat position previously selected by operation of switch 18, so that cam surface 80 functions as a mechanical "memory" which moves switch 88 to off position as soon as plate 82 returns to the angular memory position defined by plate 78. Because of the memory link feature just described, the present invention enables seat 2 to be operated by switch 18 throughout its full range of movement in each plane, while operation of the seat 2 responsive to switch 48 is limited to movement between the seat position in each plane established by switch 18 and a maximum limit of movement in one direction therefrom in each plane.

In order that the invention may be more fully understood, a description of the modes of operation of the seat with respect to horizontal adjustment will be given. In order to simplify the explanation, it will be assumed for the purposes of explanation, that only automatic control assembly 19 is operative. Seat 2 is initially adjusted by the operator to a desired position within the horizontal range of movement by energizing the forward or reverse winding of electric motor 6 by movement of switch 18 either forwardly or rearwardly from its normal centered position. Switch 18 does not energize solenoid 110 in either position. Therefore, fore and aft movement of seat 2 causes link 24 to impart rotation to both plates 78 and 82 since plate 78 is locked to plate 82 by the action of spring 114 on memory link 102. Therefore, when the seat has been adjusted to the desired position, plate 78 is aligned in an angular position in housing 60 which corresponds with the desired longitudinal seat position. Similarly, plate 82 occupies an angular position corresponding with plate 78, for which reason switch 88 mounted thereon is maintained in the off position by cam 80 acting on lever 90. Assuming now that the front door 54 is opened to permit the driver to alight from the vehicle, switch 48 is permitted to move rearwardly to a position energizing the reverse winding of motor 6, resulting in rearward displacement of seat 2. However, opening of switch 48 simultaneously energizes solenoid 110, causing memory link 102 to swing clockwise releasing plate 82 for counterclockwise rotary movement about pivot 64 while locking plate 78 to housing 60 in an angular position corresponding with the previously selected horizontal position of adjustment of the seat. As seat 2 moves rearwardly, plate 82 continues to rotate in the counterclockwise direction by virtue of the link 24 connecting leg 36 with torque rod 10. As seat 2 approaches its maximum rearward position, the shoulder 86 of arcuate cam 84 cams switch lever 98 of switch 96 in a clockwise direction until switch 96 reaches the off position, at which time the circuit between switch 48 and motor 6 is denergized, thereby arresting further rearward movement of the seat. Conversely, when the driver again enters the vehicle and closes door 54, switch 48 is cammed forwardly to a position energizing the forward winding of motor 6 resulting in forward movement of seat 2. Simultaneously, solenoid 110 is again energized to maintain memory link 102 in engagement with housing 60, thereby retaining plate 78 in the memory position. As seat 2 moves forwardly, torque rod 10 imparts clockwise rotation to plate 82 through link 24 until plate 82 moves to an angular position aligned with the locked angular position of plate 78 at which point wedge-shaped cam 80 forces lever 90 upwardly moving switch 88 of plate 82 to the off position, thus deenergizing the circuit between switch 48 and both the forward winding of motor 6 and solenoid 110. Since plate 78 remained locked in an angular position corresponding to the previously selected longitudinal position of adjustment of seat 2, it will be apparent that the forward winding of motor 6 is energized by switch 48 only until seat 2 returns to a position corresponding with the locked angular position of plate 78, or the original position of the seat before the automatic cycle of operation began. It will also be seen that since switch 88 is moved to off position when the seat 2 reaches the previously selected position, switch 48 is rendered ineffective thereafter as long as door 54 remains in the closed position. Since solenoid 110 is also deenergized, memory link 102 resumes its normal spring urged locking engagement with plate 82. As long as door 54 remains closed, memory link 102 locks plates 78 and 82 together and, therefore, permits readjustment of seat 2 by switch 18, as desired.

The operation of automatic control mechanism 22 relative to vertical adjustment of seat 2 is identical to that just described with respect to horizontal movement, except that the counterclockwise rotation of plate 82 occurs during downward movement of seat 2 so that cam 84 moves switch 96 to the off position when seat 2 has reached its maximum downward limit of travel. Conversely, clockwise movement of the plate 82 corresponds to upward movement of seat 2. Hence, when switch 18 is swung upwardly for example, plates 78 and 82 rotate together due to the locking effect of memory link 102, until the desired seat elevation has been obtained. Similarly, when door 54 is opened, solenoid 110 of control 22 is energized simultaneously with downward winding of vertical drive motor 12 causing the seat to move downwardly while plate 82 rotates independently of plate 78. Since plate 78 remains locked in a position corresponding to the preselected vertical elevation, upon closing of door 54, seat 2 is actuated upwardly by the upward winding of motor 12 until plate 82 returns to angular alignment with plate 78 at which point switch 88 is moved to off position deenergizing motor 12 and solenoid 110.

Automatic control assembly 20, which is also connected to torque rod 10 is so arranged as to cause movement of the seat from the driver selected horizontal position to the forward limit of movement when switch 50 moves to open position responsive to opening of the rear door 58. To accomplish the operation described, it is only necessary to reverse the angular direction of leg 38 so that it extends radially from pivot 64 in a direction diametrically opposite the radial direction of leg 36 of control assembly 18, or alternatively, by rotation of the entire assembly 20 180°. When disposed in this manner, automatic control 20 operates in a manner identical to that described with respect to control 19, but in a reverse sense. That is, switch 96 effects deenergization of the forward winding of motor 6 when seat 2 has reached its maximum forward limit of movement, while switch 88 is moved to off position by wedge cam 78 when seat 2 is returned rearwardly to the originally selected seat position. It will, of course, be apparent that an additional automatic control may be connected in this manner to vertical adjustment torque rod 16 and thereby effect automatic movement of the seat to its maximum upward position and subsequent return to an intermediate preselected position of elevation.

In FIG. 6, there is illustrated a schematic wiring diagram which is effective to accomplish energization of the seat actuator motors and automatic control assemblies in the manner just described. As seen in FIG. 6, the reference numeral 132 indicates a source of current such as a battery. Connected to battery 132 is a 50 ampere power circuit 134 which is connected in parallel to horizontal drive motor 6 and vertical drive motor 12, respectively, through relays 136, 138, 140 and 142. Relay 136 controls energization of the forward winding terminal 144 of motor 6, relay 138 controls energization of the rearward winding terminal 146 of motor 6, relay 140 controls energization of the upward winding terminal 148 of motor 12, and relay 142 controls energization of the downward winding terminal 150 of motor 12. A switching circuit 152 is also connected to battery 132 and is provided with four branch circuits which are connected in parallel to rear door switch 50, horizontal seat switch 18, front door switch 48 and vertical seat switch 18. While the horizontal and vertical seat switches are illustrated as separate double throw switches, it will be understood that a single four position switch may be utilized. Horizontal seat switch 18 is illustrated as a single pole double throw switch which is movable from a normally centered position upwardly to engage a contact 154, which is connected to relay 136. When relay 136 is energized by switch 18, motor 6 rotates in a direction causing forward movement of seat 2. Conversely, movement of switch 18 to engage contact 156 energizes relay 138 which, in turn, causes motor 6 to rotate in a direction imparting rearward movement to seat 2. Vertical seat switch 18, in turn, is movable alternately to engage contact 158 or 160 to energize relays 140 or 142, respectively, to cause rotation of motor 12 in a direction imparting either upward or downward movement to seat 2. Front door switch 48 in the illustrated embodiment is a multiple pole switch which is normally maintained in position engaging contacts 162 and 164 when door 54 is closed. Contacts 162 and 164 are, in turn, connected respectively to switches 88 of automatic control mechanisms 19 and 22, respectively. Since the vehicle doors are closed and the seat 2 is at rest in a horizontal and vertical position determined by operation of switches 18, movable switches 88 are both maintained in the off position by wedge cams 80, in the manner previously described. Assuming now that door 54 is opened, switch 48 moves to a position simultaneously bridging contacts 166, 168, 170 and 172. Contact 166 is connected to normally closed rearward limit switch 96 of automatic control 19 which completes the circuit to relay 138. Relay 138, in turn, energizes the reverse terminal 146 of motor 6 to impart horizontal rearward movement to seat 2. Contact 172, in turn, is connected to downward limit switch 96 of automatic control 22 which completes the circuit to relay 142. Relay 142 energizes the downward winding terminal 150 of motor 12 causing downward movement of seat 2 simultaneously with the rearward movement effected by motor 6. At the same time contacts 168 and 170, respectively, energize coil windings 174 of each solenoid 110 of automatic controls 19 and 22, respectively, causing the plunger 108 of each solenoid, in turn, to move the respective memory links 102 to positions locking each plate 78 relative to each control assembly, while permitting independent rotation of each plate 82 toward its respective rearward or downward limit switch 96. As seat 2 reaches its maximum rearward and downward limit of movement, cam 84 of each plate 82 moves switches 96 to open position, thereby deenergizing the circuit between contact 166 and relay 138, and contact 172 and relay 142, respectively. Although switches 88 carried by plates 82 are now in the closed position, the circuits therethrough to motors 6 and 12 and the other coil winding of each solenoid 110 are incomplete because of the position of door switch 48. When door 54 is closed, switch 48 is returned to a position engaging contacts 162 and 164, thereby deenergizing the coil winding 174 of solenoids 110 and completing the circuit through switches 88 of control mechanisms 19 and 22 to relays 136 and 140, respectively, and to the other coil winding 176 of each solenoid 110. Relays 136 and 140 energize the forward winding terminals 144 and 148 of drive motors 6 and 12, respectively, causing the seat to move simultaneously forwardly and upwardly. As the seat moves forwardly and upwardly, plates 82 of each control assembly 19 and 22 approach the angular position of plate 78. When plates 78 and 82 of each assembly are angularly aligned, wedge-shaped cams 80 move switches 88 to open position and deenergize the circuits between contacts 162 and 164 and relays 136 and 140, respectively, thereby arresting forward and upward movement of the seat at the same position occupied previous to initiation of the automatic cycle. Simultaneously, coil windings 176 of solenoid 110 are deenergized.

Rear door switch 50, as illustrated, is a single pole double throw switch which is movable alternately to engage contacts 178 and 182 or 180, responsive to opening or closing, respectivtly, of the rear vehicle door 58. Contacts 178 and 180, in turn, are connected respectively to fixed limit switch 96 and movable limit switch 88 of automatic control assembly 20. With the rear door closed and the seat at rest, movable switch 88 is maintained in off position by wedge cam 80, previously mentioned, and therefore, interrupts the circuit between contact 180 and relay 138. Assuming now that rear door 58 is opened, switch 50 moves to a position simultaneously engaging contact 178 and contact 182 to simultaneously energize relay 136 of motor 6 and coil winding 174 of solenoid 110 of automatic control 20. Relay 136 energizes the forward winding terminal 144 of motor 6, causing forward movement of seat 2, while solenoid 110 retains plate 78 in a locked angular position corresponding to the previously selected horizontal seat position. Seat 2 continues to move forwardly until rotation of plate 82 moves fixed limit switch 96 to off position arresting further forward movement of the seat. Upon closing door 58, switch 50 moves to engage contact 180 which completes the circuit through switch 88, which is now closed, to relay 138 of motor 6 and coil winding 176 of solenoid 110 of assembly 20. Relay 138 energizes the rearward winding terminal 146 of motor 6, causing the seat to move rearwardly until plate 82 is angularly aligned with locked plate 78 at which point wedge cam 80 moves switch 88 to the off position, completing the automatic cycle. Switches 184 and 186 are jam switches which are preferably located in the front and rear door sills, respectively. When the front door is open, switch 184 opens and deenergizes the circuit to switch 50, while switch 186 opens to deenergize the circuit to switch 48 when the rear door is open. Thus, it is impossible to cause energization of both the forward and rearward winding of motor 6 by opening both doors either simultaneously or in sequence. For example, if the front door is opened first, switch 184 is likewise opened and, subsequently, opening of the rear door will have no effect since switch 184 prevents establishment of a circuit through switch 50. However, since opening of the rear door under such circumstances will cause switch 186 to open also, it will be apparent that the circuit through switch 48 will also be deenergized, thereby causing the seat to remain at whatever intermediate position it occupied when the rear door was opened. If the rear door is then closed, the seat will resume its rearward and downward movement, since switch 186 would then be returned to closed position by the rear door. Should both the front and rear door be opened simultaneously, the seat will remain immobile, since both switches 184 and 186 will open simultaneously and thus prevent energization of the circuits through both switches 48 and 50.

Since certain abnormal sequences of operation of the front and rear door may occur inadvertently, the circuit includes two additional normally closed switches 190 and 192 which are moved to open position upon energization of relays 194 and 196, respectively. Relays 194 and 196 are energized through a separate circuit 188 which is branched to connect in parallel with a second switch blade 88a associated with each switch 88 of automatic mechanism 19 and 20. Hence, whenever switch 88 of control 19 is in closed position, relay 194 moves switch 190 to open position and prevents energization of the circuit through switch 50. Conversely, whenever switch 88 of control mechanism 20 is in closed position, relay 196 moves switch 192 to open position, thereby preventing energization of the circuits through switch 48. This arrangement prevents conflicting energization of the circuits when, for example, the front door is opened followed by opening of the rear door and subsequent closing of the front door, while the rear door remains opened, or a reverse of the sequence.

From the foregoing, it will be seen that a novel and efficient seat control mechanism and operating system therefor has been devised. By virtue of the invention, greatly increased flexibility of operation of conventional power operated seats is readily obtained without interferring in any way with normal manual selection of seat position. In addition, by virtue of the "package" construction of the automatic control or "memory" assembly, the invention is readily adaptable for use in conjunction with any electric power operated vehicle seat adjuster.

Whille but one embodiment of the invention has been shown and described, it will be apparent that other changes and modifications may be made therein. It is, therefore, to be understood that it is not intended to limit the invention to the embodiment shown, but only by the scope of the claims which follow.

We claim:

1. An automatic control for a structure movable by power means to a selected position, said control comprising a support, a member carried by said support synchronously movable with said structure, a fixed limit switch on said support engageable by said member to deenergize said power means upon movement of said structure to a predetermined position in one direction, a limit switch movable with said member for deenergizing said power means upon movement of said structure in the opposite direction, movable means engaged by said movable limit switch to effect said deenergization, and means for adjusting said movable means in a position corresponding with said selected position.

2. An automatic control for a structure movable by power means to a selected position, said control comprising a rotary member synchronously movable with said structure, a stationary limit switch for deenergizing said power means when engaged by said motary member upon movement of said structure to a predetermined position in one direction, a limit switch movable with said rotary member for deenergizing said power means upon movement of said structure in the opposite direction, a second rotary member having means engaged by said movable limit switch to deenergize said power means, and means for rotatively adjusting said second member to an angular position corresponding with said selected position.

3. An automatic control for a structure having manual selector means for causing power operation of said structure to a selected position, said control comprising a rotary member synchronously movable with said structure, a stationary limit switch for deenergizing said power means when engaged by said rotary member upon movement of said structure to a predetermined position in one direction, a limit switch carried by said rotary member for deenergizing said power means upon movement of said structure in the opposite direction, a second rotary member having means engaged by said movable limit switch to deenergize said power means, means for rotatively adjusting said second member to an angular position corresponding with said selected position, a remote selector for causing power operation of said structure, and means for temporarily locking said second rotary member in said angular position during operation of said remote selector.

4. In a device of the class described, the combination of a support, a first swingable member mounted on said support, a second swingable member mounted coaxially with said first member, a switch fixed on said support, a second switch secured to said second member, cam means on said first member for actuating said second switch, cam means on said second member for actuating said first switch, and means for selectively locking said first member to either said second member or said support.

5. In a device of the class described, the combination of a support, a first swingable member mounted on said support, a second swingable member mounted coaxially with said first member, a normally closed switch fixed on said support, a second normally closed switch secured to said second member, cam means on said first member for actuating said second switch to off position, cam means on said second member for actuating said first switch to off position, and means carried by said first member for selectively locking said first member to either said second member or said support.

6. In a device of the class described, the combination of a support, a first swingable member mounted on said support, a second swingable member mounted coaxially with said first member, a normally closed switch fixed on said support, a second normally closed switch secured to said second member, cam means on said first member for actuating said second switch to off position, cam means on said second member for actuating said first switch to off position, and an electro-mechanical device carried by said first member for selectively locking said first member to either said second member or said support.

7. In a device of the class described, the combination of a support, a first swingable member mounted on said support, a second swingable member mounted coaxially with said first member, a normally closed switch fixed on said support, a second normally closed switch secured to said second member, cam means on said first member for actuating said second switch to off position, cam means on said second member for actuating said first switch to off position, and a solenoid carried by said first member for selectively locking said first member to either said second member or said support.

8. In a vehicle having doors, a seat, a four way adjuster for said seat, power means for actuating said adjuster, a manual switch for energizing said power means to selectively adjust said seat vertically and horizontally, a door actuated switch for energizing said power means to simultaneously move said seat vertically and horizontally to a downward and rearward limit, automatic means for controlling the limits of movement of said seat responsive to operation of said door actuated switch, said means comprising stationary limit switches effective to deenergize said power means when said seat is moved to its downward and rearward limit by said door actuated switch, movable limit switches effective to deenergize said power means upon movement of said seat forwardly and upwardly to a selected position, and movable means defining the off position of said movable limit switches, said last mentioned means being selectively movable with said seat when operated by said manual switch and stationary when said seat is operated by said door actuated switch.

9. In a four-way power seat, means for adjusting said seat to a selected vertical position and a selected horizontal position within its normal range of movement in both planes, a pair of automatic controls for said seat, one for vertical movement and the other for horizontal movement, each control comprising, fixed means for limiting movement of said seat structure to its maximum position of adjustment in one direction, and means responsive to adjustment of said seat to said selected vertical position and selected horizontal position for adjustably setting the limit of movement of said seat structure in the other direction.

10. In a four-way power seat, means for adjusting said seat to a selected vertical position and a selected horizontal position within its normal range of movement in both planes, automatic control means for said seat to control vertical movement thereof and horizontal movement thereof within a respective range of movement between a set limit position and a fixed limit position, said control means including, fixed means for limiting movement of said seat structure to its maximum position of adjustment in one horizontal and vertical direction, and means responsive to movement of said seat to said selected vertical position and horizontal position to adjustably set the limit of movement of said seat in an opposite horizontal and vertical direction.

11. In a four-way power seat, means for adjusting said seat to a selected vertical position and a selected horizontal position within its normal range of movement in both planes, a pair of automatic controls for said seat, one for vertical movement and the other for horizontal movement, each control comprising, a support, a driven member on said support operatively connected to said seat for movement therewith, a limit switch fixedly mounted on said support and actuated to an "off" position by said driven member in response to movement of said seat to its maximum position of adjustment in one direction, a second limit switch mounted on said driven member for movement therewith, means mounted on said support for actuating said second switch to an "off" position, and means for adjusting said last mentioned means so that the "off" position of said second switch corresponds to said selected position of said seat.

12. In a vehicle body having a door and a seat structure movable in vertical directions, the combination comprising, power operated means for moving said seat, first means for limiting movement of said seat structure in one vertical direction, second means adjustable by operation of said power operated means for setting the limit of movement of said seat structure in the other vertical direction, and door actuated control means for energizing said power operated means to move said seat structure within the set range of movement thereof between said first limit means and said second adjustable limit means upon opening and closing movement of said door.

13. In a vehicle body having a door and a seat structure movable in vertical directions, the combination comprising, power operated means for moving said seat, first means for limiting movement of said seat structure in one vertical direction, manual control means for said power operated means, second means adjustable upon operation of said power operated means by said manual control means for setting the limit of movement of said seat structure in the other vertical direction, and door actuated control means for energizing said power operated means to move said seat structure within the set range of movement thereof between said first limit means and said second adjustable limit means upon opening and closing movement of said door.

14. In a vehicle body having a door movable between open and closed positions and a vehicle seat movable between a selected and a limit position, the combination comprising, power operated means for moving said seat, first control means operable to energize said power operated means to move said seat to a selected position, and door actuated control means operable to energize said power operated means, said door actuated control means controlling the limits of movement of said seat upon opening and closing movement of said door and including first switch means effective to deenergize said power operated means when said seat is moved to its limit position upon opening movement of said door, second switch means operable to deenergize said power operated means upon movement of said seat from its limit position to its slected position upon closing movement of said door, and means selectively movable when said power operated means is energized by said first control means and being stationary when said power operated means is energized by said door actuated control means for controlling operation of said second switch means.

15. In a vehicle body having a door movable between open and closed positions and a vehicle seat movable between a selected and a limit position, the combination comprising, power operated means for moving said seat, manually operable means operable to energize said power operated means to move said seat to a selected position, and door actuated control means operable to energize said power operated means, said door actuated means controlling the limits of movement of said seat upon opening and closing movement of said door and including first switch means effective to deenergize said power operated means when said seat is moved to its limit position upon opening movement of said door, second switch means operable to deenergize said power operated means upon movement of said seat from its limit position to its selected position upon closing movement of said door, and means selectively movable when said power operated means is energized by said manually operable means and being stationary when said power operated means is energized by said door actuated control means for controlling operation of said second switch means.

16. In a vehicle body having a door movable between open and closed positions and a vehicle seat movable between a selected and a limit position, the combination comprising, power operated means for moving said seat, first control means operable to energize said power operated means to move said seat to a selected position, and door actuated control means operable to energize said power operated means, said door actuated control means controlling the limits of movement of said seat upon opening and closing movement of said door and including first switch means effective to deenergize said power operated means when said seat is moved to its limit position upon opening movement of said door, second switch means synchronously movable with said seat and operable to deenergize said power operated means upon movement of said seat from its limit position to its selected position upon closing movement of said door, and means synchronously movable with said seat when said power operated means is energized by said first control means and being stationary when said power operated means is energized by said door actuated control means for controlling operation of said second switch means.

17. In a vehicle body having a door and a movable seat structure, the combination comprising, power operated means operatively connected to said seat structure for movement thereof, first control means for energizing said power operated means, first means limiting movement of said seat structure in one direction to set a first limit position for said seat structure, second means operable upon operation of said power operated means by said first control means for adjustably limiting movement of said seat structure in the other direction to set an adjustable second limit position for said seat structure and thereby set the range of movement of said seat structure, and door actuated control means responsive to sequential opening and closing movement of said door for energizing said power operated means to move said seat structure within said set range of movement thereof between said first limit position and said second adjustable limit position, opening movement of said door causing said door actuated control means to energize said power operated means to move said seat structure from said second adjustable limit position thereof to said first limit position thereof, sequential closing movement of said door causing said door actuated control means to energize said power operated means to move said seat structure from said first limit position thereof to said second adjustable limit position thereof.

18. In a vehicle body having a door and a movable seat structure, the combination comprising, power operated means operatively connected to said seat structure for movement thereof, manual control means for energizing said power operated means, first means limiting movement of said seat structure in one direction to set a fixed limit position for said seat structure, second means operable upon operation of said power operated means by said manual control means for adjustably limiting movement of said seat structure in the other direction to set an adjustable limit position for said seat structure and thereby set the range of movement of said seat structure and door actuated control means responsive to sequential opening and closing movement of said door for energizing said power operated means to move said seat structure within said set range of movement thereof between said fixed limit position and said adjustable limit position, opening movement of said door causing said door actuated control means to energize said power operated means to move said seat structure from said adjustable limit position thereof to said fixed limit position thereof, sequential closing movement of said door causing said door actuated control means to energize said power operated means to move said seat structure from said fixed limit position thereof to said adjustable limit position thereof.

19. An automatic control for a structure movable by power means to a selected position, said control comprising a rotary member synchronously movable with said structure, a stationary limit switch for deenergizing said power means when engaged by said rotary member upon movement of said structure to a predetermined position in one direction, a second limit switch for deenergizing said power means upon movement of said structure in the opposite direction, rotary control means, means controlled by said rotary control means and engageable with said second limit switch to deenergize said power means, and means for rotatively adjusting said rotary control means to an angular position to cause said engageable means to deenergize said second limit switch at said selected position.

20. An automatic control for a structure having power means and manual selector means for causing power operation of said structure to a selected position, said control comprising, a rotary member synchronously movable with said structure, a stationary limit switch for de-energizing said power means when engaged by said rotary member upon movement of said structure to a predetermined position in one direction, a second limit switch for deenergizing said power means upon movement of said structure in the opposite direction, a second rotary member, means controlled by said second rotary member and engageable with said second limit switch to deenergize said power means, means for rotatively adjusting said second member to an angular position to cause said engageable means to deenergize said second limit switch at said selected position, and a remote selector for causing power operation of said structure.

21. The combination comprising, a support, a seat mounted on said support for displacement between a selected position and a predetermined position, power operating means for so displacing said seat, a source of power, switch means connected with said source of power for selectively energizing and deenergizing said power operating means, switch operating means, means mounting said switch means and said switch operating means on said support for rotational movement of one of said means relative to the other of said means between one rotative position relative thereto at said selected seat position wherein said switch means is operative to deenergize said power operating means and another rotative position relative thereto wherein said switch means is operative to energize said power operating means, means operative upon displacement of said seat for locating said one of said means in said another position thereof, and control means for actuating said power operating means, said control means including said switch means and being energized through said switch means upon movement of said one of said means to said another rotative position thereof to actuate said power operating means to displace said seat from said predetermined seat position to said selected seat position.

22. In a power seat, means for adjusting said seat to a selected vertical position and a selected horizontal position within its normal range of movement in both planes, a pair of automatic controls for said seat, one for vertical movement and the other for horizontal movement, each control comprising, a support, a driven member on said support operatively connected to said seat for movement therewith, a limit switch fixedly mounted on said support and actuated to an "off" position by said driven member in response to movement of said seat to its maximum position of adjustment in one direction, a second limit switch mounted on said support, means mounted on said support for actuating said second switch to an "off" position, and means for locating said last mentioned means so that the "off" position of said second switch corresponds to said selected position of said seat.

References Cited by the Examiner

UNITED STATES PATENTS

| | | | |
|---|---|---|---|
| 1,560,057 | 11/1925 | Hunter | 200—47 |
| 1,575,010 | 3/1926 | Scheer | 200—47 |
| 2,036,118 | 3/1936 | Carr | 296—68 |
| 2,117,409 | 5/1938 | Dorsey | 296—68 |
| 2,239,400 | 4/1941 | Pitt et al. | 200—47 |
| 2,350,751 | 6/1944 | Gliubich | 318—446 |
| 2,430,902 | 11/1947 | Yardeny et al. | 318—446 |
| 2,442,711 | 6/1948 | Schaedler | 200—47 |
| 2,602,124 | 7/1952 | Anderson | 200—47 |
| 2,823,949 | 2/1958 | Williams et al. | 115—14 |
| 2,829,002 | 4/1958 | Leavengood et al. | 115—14 |

FOREIGN PATENTS

| | | |
|---|---|---|
| 480,983 | 3/1938 | Great Britain. |

A. HARRY LEVY, *Primary Examiner.*

RANDOLPH O. LEWIS, FRANK B. SHERRY, G. LEO BREHM, C. E. HARRIS, PHILIP ARNOLD,
*Examiners.*